April 9, 1968
C. B. NOLTE
3,377,600
ZERO LINKAGE ADJUSTMENT MECHANISM
Filed Sept. 16, 1966
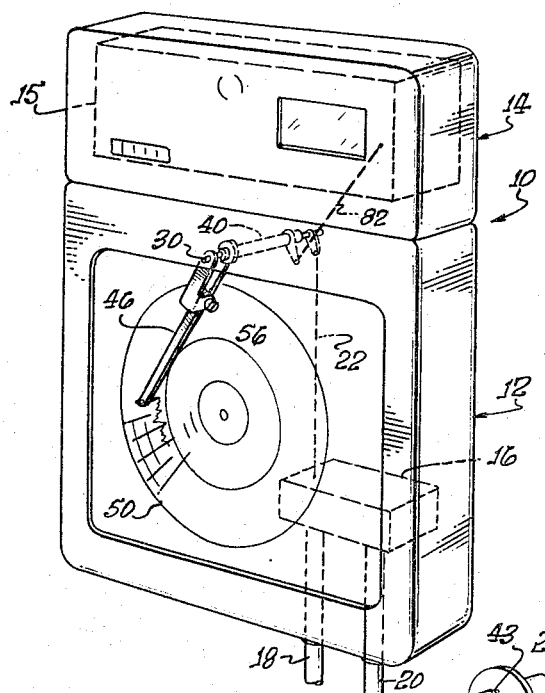
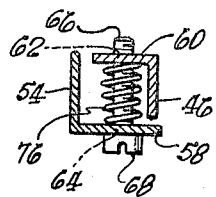
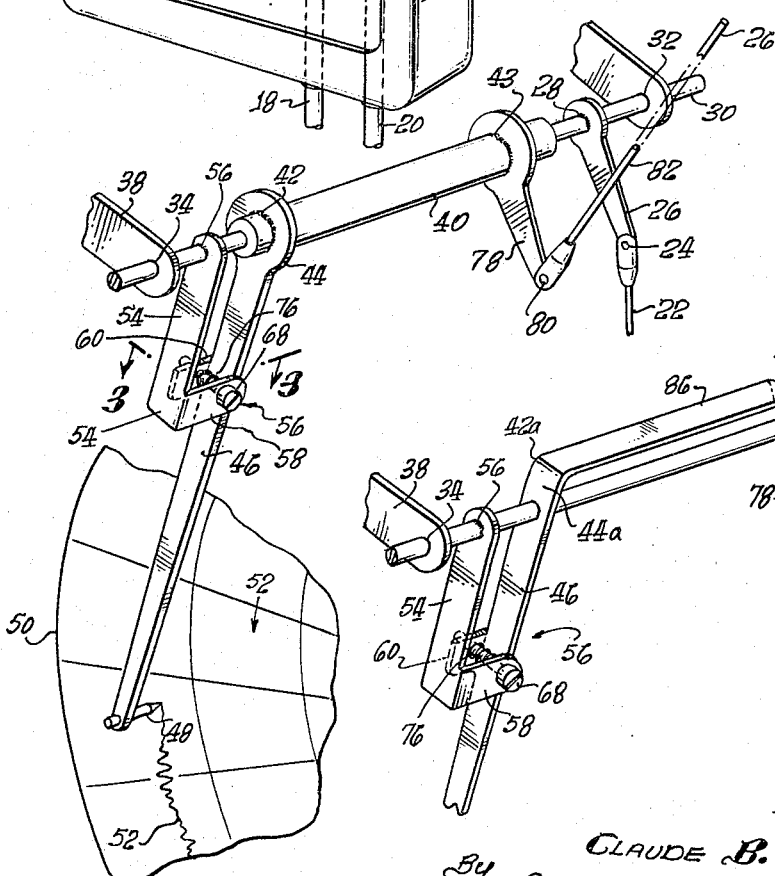
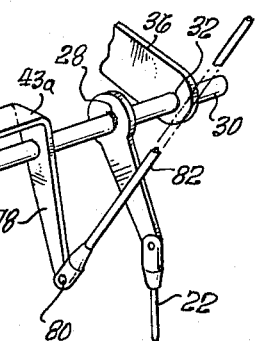
INVENTOR.
CLAUDE B. NOLTE,
By Fulwider, Patton, Rieber, Lee & Utecht
ATTORNEYS.

United States Patent Office 3,377,600
Patented Apr. 9, 1968

3,377,600
ZERO LINKAGE ADJUSTMENT MECHANISM
Claude B. Nolte, Placentia, Calif., assignor to Kingmann-White, Inc., Placentia, Calif., a corporation of Texas
Filed Sept. 16, 1966, Ser. No. 579,877
3 Claims. (Cl. 346—139)

ABSTRACT OF THE DISCLOSURE

A combination recording meter and integrator unit having the recording pen arm and the integrator drive interconnected for common, relatively fixedly adjusted movement whereby zeroing of the meter pen will at the same time adjust the integrator unit to zero. An adjustable connection is provided between a drive means connected to a condition-responsive transducer and the pen arm and adjustment of this connection to move the pen arm to zero position to compensate for variations in the transducer will, at the same time, bring the integrator drive to its zero position. Both concentric shafts and lever and connecting strut mountings are disclosed.

---

This invention relates to improvements in measuring and metering apparatus, and more particularly to means for simultaneous, correlated adjustment of two or more recording or measuring devices with respect to a single measurement signal source, such as that derived from means for continuous measurement of the quantity of flow of fluid past a given point in a channel, conduit, or the like fluid conductor.

The apparatus of this invention finds its most important application in connection with combined recording, indicating and integrating apparatus of the type disclosed in my co-pending application, Ser. No. 472,847, filed July 19, 1965, now Patent No. 3,322,339, wherein it is necessary from time to time to make a zero setting adjustment of both the recording meter pen and the integrator unit with respect to a common signal responsive transducer input. Such transducer, for example, may be a static or differential pressure sensing type such as a manometer, bellows, Bourdon tube or the like, and the adjustment must be such that the recording meter and integrator readings are always accurately correlated with one another and with the measurement signal sensing transducer.

Pressure-sensing transducer devices, whether they be mercurial manometers, bellows, Bourdon tubes or the like devices, suffer from several well known characteristics which cause the zero position taken by such sensing devices to wander or vary from time to time. In other words, when no pressure is exerted upon such measuring devices the measuring or indicating means connected to them should always return to zero. In practice, however, the zero indication varies, and in the case of mercurial meters this is mainly the result of change in the density of the mercury with change in temperature. Also, with changes of the volume of mercury resulting from changes in temperature in the manometer, the float which senses the position of the mercury surface varies in height, resulting in incorrect zero position indications. In the case of bellows and Bourdon tube types of sensing devices, changes in spring rates of the elastic elements occur as the result of changes in temperature or fatigue of the materials thereof over a period of time, resulting in the output linkages extending therefrom taking up different zero positions at different times.

As a consequence of the foregoing deficiencies, recorders actuated by such sensing devices must be provided with means for performing an operation known as "zeroing the meter" or in other words means for adjusting the pens to zero positions relative to predetermined zero positions on the charts when the pressures to be measured are at zero. When an integrator is combined with a recorder such as that in my hereinbefore mentioned co-pending application, Ser. No. 472,847, now Patent No. 3,322,339, it becomes additionally necessary for both the integrator and the recorder to be zeroed or referenced to a predetermined zero position with relation to the pressure-sensing device.

Heretofore, in connection with the usual combination of measuring devices such as the beforementioned integrating and recording system, the adjustment of the recorder pen to zero and the adjustment of the integrator linkage also to zero, has been done independently by separate adjustment means. With such separate adjustment means, when the operator performs the operation of "zeroing the meter" the static or differential pressure across the pressure-sensing device is removed by suitable means, such that it is brought to a zero value, and under such conditions the deviation of the pen from the predetermined zero mark on the chart is noted and corrected by manipulation of an adjustment screw on the pen arm or elsewhere. Following this the operator would then make a second separate adjustment also to bring the integrator linkage or other mechanism in the integrator unit to its associated zero position. It has been found in practice that one or the other of such adjustments, usually the second adjustment, is frequently either overlooked or erroneously performed, resulting in erroneous operation of either the integrator or the recorder and a lack of correspondence between the measurements made by the integrator and the recorder portion of the apparatus.

To obviate the latter erroneous adjustment operations, it has been found necessary to provide an activating linkage interconnecting the recording meter and the integrator unit which is permanently adjusted to bring the recording meter and integrator unit to permanent simultaneous zero adjustments, and to provide an additional, simple adjustment means which acts in such a manner as automatically and simultaneously to bring both the thus adjusted recorder pen and the integrator mechanism to zero adjustment relative to the transducer when the recorder pen is adjusted to a zero position.

Accordingly, it is a principal object of this invention to provide a single means for simultaneously adjusting two or more devices to a predetermined setting relative to a common transducer means.

It is another object of this invention to provide means for simultaneously adjusting two or more metering devices such as a pen recorder and an integrator and the pressure-sensing device connected thereto, to zero.

It is still another object of this invention to provide means for permanently correlating the zero setting to two or more metering devices, and for simultaneous zeroing of both such metering devices with respect to a single activating signal source by a single adjustment means.

These and other objects, advantages and features of novelty will be evident hereinafter.

In the drawings which illustrate a presently preferred embodiment of the invention and in which like reference characters indicate the same or similar parts throughout the several views:

FIGURE 1 is a reduced-sized, perspective elevational view, partially schematic, of the general assembly of an encased integrator apparatus and a conventional orifice flow meter of the type which employs circular charts and showing the environment of the apparatus of the present invention therein;

FIGURE 2 is an enlarged, perspective, partially schematic, detailed view of the general assembly of the apparatus of the invention shown in FIGURE 1;

FIGURE 3 is a cross-sectional, detailed view taken on line 3—3 of FIGURE 2; and

FIGURE 4 is a perspective, partially schematic, detailed view of a modified version of the apparatus of the invention shown in FIGURE 2.

Apparatus.—Referring first primarily to FIGURE 1, the apparatus assembly shown generally at 10 comprises a typical, conventional, circular chart type recording meter shown generally at 12, together with an added integrator unit shown generally at 14 and containing integrating apparatus illustrating therein in broken lines 15, which may be of a type which is the same as or similar to that disclosed at 10 in my hereinbefore mentioned co-pending application, Ser. No. 472,847, now Patent No. 3,322,339.

The meter 12 may be substantially any one of the well known conventional types employing one or more transducer means therein. For convenience of description and illustration of the invention, but not by way of limitation, only one pressure-responsive transducer means is considered and this transducer means is illustrated in broken lines at 16. This transducer means may be any one of the hereinbefore mentioned types of pressure-responsive devices, such as for example, a mercurial manometer, bellows, Bourdon tube or any other signal-responsive device, electrical or otherwise. The pressure-responsive transducer 16 in the meter may be connected, for example, to static or differential pressure connecting lines such as shown at 18 and 20, leading to static and differential pressure connections of a conventional orifice installation in a flow line (not shown). The pressure differential transducer 16 is linked by a rod as shown in broken lines at 22 in FIGURE 1 and in solid lines in FIGURE 2, to a pivot 24 at the outer end of a pen-actuator lever 26 which is in turn drivingly attached at 28 by suitable means, such as by welding or soldering, to a pen-actuator shaft 30.

The pen-actuator shaft 30 is rotatably supported adjacent opposite ends thereof in bearings 32 and 34 suitably supported in the interior of the meter 12 by bearing-supporting members 36 and 38, respectively. Rotatably supported on an intermediate section of the pen-actuator shaft 30 is a tubular pen arm supporting shaft or sleeve 40. Fixedly suitable means, such as by welding or soldering, as shown at 42, adjacent one end of the sleeve 40, is the hub end 44 of a radially extending pen arm 46. The pen arm 46 is provided at its radially outer end with a suitable pen tip 48 which is positioned to move over the graduated marginal surface portion of a circular chart 50 to produce, as the circular chart is rotated about its center at a uniform known rate, a graphical record as shown at 52.

Fixed at 56, by suitable means, such as by welding or soldering, adjacent the other end of the beforementioned pen-actuator shaft 30, is a radially extending, pen arm drive lever 54. The pen arm drive lever 54 is provided at its radially outer end with a pen arm angular position adjustment mechanism shown generally at 56. The pen arm angular position adjusting mechanism 56, as best shown in FIGURE 3, includes a pair of laterally extending, oppositely spaced-apart ear members 58 and 60, the ear member 58 being preferably integrally formed from the lower portion of the pen arm drive lever 54 and the ear member 60 being preferably formed integrally with the pen arm 46. Extending cross-wise or circumferentially relative to the rotational arc thereof, and rotatably supported in an unthreaded bearing hole 62 in ear member 58 and a coaxial threaded hole 64 formed in the opposite ear member 60 respectively, is a threaded adjustment screw 66 making threaded engagement with the threads in hole 64, and having a slotted head 68 on the opposite, exposed end thereof. A small helical spring 76 is carried coaxially on the adjustment screw 66, intermediate the adjacent inner surfaces of the ear members 58 and 60, and acting under compression therebetween, serves to bias the inner end of the slotted head 68 into abutment with the outside surface of the ear member 60. Upon rotation of the adjustment screw 66 by means of a suitable tool inserted in the slot of the slotted head 68, the separation of the ear members 58 and 60 may be varied over a limited range. Such limited variation of the separation of the ear members 58 and 60 results in limited adjustment of the rotational angular position of the pen arm drive lever 54 relative to the pen arm 46, about the common longitudinal axis of the coaxial pen actuator shaft 30 and pen actuator sleeve shaft 40.

Fixed at 43, by suitable means such as by welding or soldering, adjacent the end of the pen-actuator sleeve shaft 40 opposite the end thereof to which the hub end 44 of the pen arm 46 is fixed, is a radially extending integrator drive lever 78. Pivotally attached at 80 to the radially outer end of the integrator drive lever 78 is an integrator drive link 82 which may be the counterpart of either of the drive links 52 or 54 which enter the integrator and are suitably coupled with the integrating apparatus, as shown and described in my aforementioned co-pending application, Ser. No. 472,847, now Patent No. 3,322,339.

Referring next primarily to FIGURE 4 in which a modified version of the apparatus of FIGURE 2 is illustrated, the pen-actuator shaft 30 is rotatably supported adjacent opposite ends thereof in bearings 32 and 34 suitably supported in the interior of the meter 12 by bearing-supporting members 36 and 38, respectively, as hereinbefore described in connection with FIGURE 2. Instead of having a pen-supporting tubular shaft or sleeve 40 rotatably supported on the intermediate portion of the pen-actuator shaft 30, the arrangement illustrated in FIGURE 4 employs a relatively rigid, longitudinally extending strut member 86. Fixed by suitable means or formed integrally therewith at 42a adjacent one end of the strut member 86 is the upper end portion 44a of the radially extending pen arm 46. The pen arm 46 is provided at its radially outer end with a suitable pen tip 48 which is positioned to move over the graduated marginal surface portion of the circular chart 50 to produce, as the circular chart is rotated about its center at a uniform known rate, a graphical record as shown at 52 in FIGURE 2.

Fixed at 43a by suitable means or formed integrally therewith adjacent the end of the pen-actuator strut 86 opposite the end thereof to which the upper end of the pen arm 46 is fixed, is the hereinbefore described radially extending integrator drive lever 78. Pivotally attached at 80 to the radially outer end of the integrator drive lever 78 is the integrator drive link 82 which extends to the integrator as hereinbefore described in connection with FIGURE 2. The balance of the apparatus elements of FIGURE 4 are the same as those hereinbefore described in connection with FIGURE 2.

Operation.—The rotational angular position of the pen arm 46 relative to the integrator drive lever 78 is fixed by the interconnecting pen arm supporting sleeve 40, as shown in the apparatus of FIGURE 2, or by the strut member 86, in the case of the apparatus of FIGURE 4. Normally, at the time of the initial installation of the integrator unit 14 upon the meter 12, the linkages within the meter 12 and the integrator apparatus of the integrator unit 14, including the length of the integrator drive link 82, are adjusted such that when the pen arm 46 and pen 48 thereon are positioned on or "zeroed" relative to the zero line of the circular chart 50, the integrator mechanism within the integrator unit 14 driven by the integrator drive lever 78 and link 82 is also simultaneously, precisely "zeroed" such that the quantity being integrated by the integrator remains at a zero value so long as the aforesaid pen 48 remains at its zero position on the circular chart 50.

This relationship between the zero position of the pen arm 46 and the integrating apparatus within the integrator 14 then remains constant thereafter throughout the remaining service of the apparatus. However, as hereinbefore explained, the operating characteristics of the transducers are subject to changes and variations which disturb the relationship between the zero position or condition of the transducer and that of the pen arm 46 and the integrator 14 such that zeroing adjustments have to be frequently made under operating conditions while in use in the field.

When such zeroing adjustments are to be made the static or differential pressure normally applied to the transducer 16 through the connections 18 and 20 is temporarily removed or reduced to zero by suitable means. The position of the pen tip 48 relative to the zero line on the circular chart 50 is then observed and any deviation thereof from zero is corrected by adjustment of the adjustment screw 66 to rotationally move the angular position of the pen drive lever 54 relative to the pen arm 46 in the direction and amount necessary to bring the pen tip 48 to bear upon the zero line of the circular chart 50. The rotational angular adjustment of the pen arm 46 relative to the pen drive lever 54, thus effected, is transmitted as a commensurate coaxial rotational movement of the pen arm supporting sleeve 40 relative to the pen-actuator shaft 30, thereby moving the integrator drive lever 78 through a rotational angle relative to the pen-actuator shaft 30 which is precisely equal to the rotational angular movement of the pen arm 46 relative to the pen drive lever 54, thereby accomplishing a simultaneous, precisely accurate, zeroing of the integrating apparatus within the integrator unit 14. Thus, the single pen arm position adjusting mechanism 56 serves to simultaneously adjust both the pen tip 48 and the mechanism in the integrating apparatus unit 14 to zero, thereby eliminating the necessity for making two such separate adjustments, one to adjust the pen arm 46 to zero position and the other to adjust the integrating apparatus to a corresponding zero integrating position.

The herein beforedescribed apparatus of the invention has the practically important advantage of requiring only a single adjustment to bring both the pen and the integrator to zero simultaneously. Since the pen and the integrator are initially permanently adjusted into synchronization with respect to their zero positions, that particular adjustment is not needed to be repeated by the operator throughout the reasonable life of the combined metering and integrating apparatus. Consequently, it is made possible for an operator quickly to make one basic check to be sure of the synchronization of all three elements in the apparatus namely, pressure transducer, recorder pen and integrator. Thereafter, if a change occurs in the output characteristics of the transducer, adjustment of the pen to zero, to compensate for such change simultaneously and automatically brings the integrator also to zero adjustment. Errors which would thus otherwise frequently occur under the disadvantageous maintenance conditions encountered under field operating conditions are thereby eliminated.

It is to be understood that the foregoing is illustrative only and that the invention is not limited thereby, but includes all modifications thereof within the scope of the definition of the appended claims.

I claim:

1. In a metering device in which a transducer output is coupled to the input of two devices for simultaneous correlated actuation thereof in response to the output of said transducer, coupling apparatus therefor comprising:

first and second drive means;
means mounting said first and second drive means for coaxial rotation relative to one another about a common axis of rotation, one of said drive means comprising a shaft and the other comprising a pair of lever arm members, each rotatably supported upon and relative to the shaft, and a strut member fixedly, drivingly interconnecting said lever arm members;
means operatively coupled to said first drive means for imparting rotational angular movement thereto in response to output movement of said transducer;
means operatively connected to said second drive means for simultaneously actuating the input of said two devices;
and adjustable coupling means rotationally coupling said first and second drive means together for simultaneous rotation about said common axis, said coupling means including means for fixed adjustment, between angular limits, of the rotational angular position of said first and second drive means relative to one another about said common axis;
whereby such adjustment simultaneously adjusts the input of both said two devices relative to said transducer.

2. Drive means for a combination recording meter and integrator actuated in response to the output of a common transducer comprising:

a drive shaft;
means operatively coupling said drive shaft to the transducer for imparting rotational angular movement to the shaft in response to output movement of the transducer;
a pen arm mounted on said drive shaft for rotation relative thereto;
a drive arm rigidly mounted on said drive shaft and extending adjacent said pen arm;
means adjustably connecting said drive arm to said pen arm so as to affect movement of said pen arm by said adjustment relative to said drive shaft without corresponding movement of the drive shaft;
and means connecting said pen arm to the drive of said integrator unit whereby movement of said pen arm to a zero position by said adjusting means also affects comparable movement of the integrator unit drive to its zero position.

3. Drive means for a combination recording meter and integrator actuated in response to the output of a common transducer comprising:

a drive shaft;
means operatively coupling said drive shaft to the transducer for imparting rotational angular movement to the shaft in response to output movement of the transducer;
a pen arm;
a lever arm spaced from said pen arm along an axis;
means rigidly interconnecting said pen arm and lever arms;
means mounting said pen arm and lever arm on said drive shaft for normal rotational movement therewith and for adjusting angular movement relative thereto, with the axis along which said pen arm and lever arm are separated lying substantially coincident with the axis of said drive shaft;
means connecting said lever arm to the input of said integrator unit;
a drive arm rigidly mounted on said drive shaft and disposed adjacent said pen arm;
and means adjustably connecting said drive arm to said pen arm to adjust the relative angular position therebetween whereby to affect simultaneous adjustment of the zero positions of the pen arm and the integrator unit.

References Cited

UNITED STATES PATENTS 2,410,335  10/1946  Burdick _____ 346—49

RICHARD B. WILKINSON, *Primary Examiner.*

EDITH C. SIMMONS, *Assistant Examiner.*